(12) United States Patent
Gou et al.

(10) Patent No.: US 8,675,533 B2
(45) Date of Patent: Mar. 18, 2014

(54) METHOD FOR DETERMINING WIRELESS FRAME BEARING MULTIMEDIA BROADCAST MULTICAST SERVICE NOTIFICATION INFORMATION AND TRANSMITTER THEREOF

(75) Inventors: Wei Gou, Guangdong (CN); Zijiang Ma, Guangdong (CN); Nan Zhao, Guangdong (CN); Dongli Chen, Guangdong (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 38 days.

(21) Appl. No.: 13/258,626

(22) PCT Filed: Nov. 3, 2010

(86) PCT No.: PCT/CN2010/078370
§ 371 (c)(1),
(2), (4) Date: Sep. 28, 2011

(87) PCT Pub. No.: WO2011/054291
PCT Pub. Date: May 12, 2011

(65) Prior Publication Data
US 2013/0070659 A1 Mar. 21, 2013

(30) Foreign Application Priority Data
Nov. 6, 2009 (CN) .......................... 2009 1 0110107

(51) Int. Cl.
*H04H 20/71* (2008.01)
(52) U.S. Cl.
USPC .......... 370/311; 370/312; 370/313; 370/318; 370/349; 370/470; 370/476
(58) Field of Classification Search
None
See application file for complete search history.

(56) References Cited

U.S. PATENT DOCUMENTS

| 2009/0207774 A1* | 8/2009 | Lee et al. ....................... 370/312 |
| 2009/0303910 A1* | 12/2009 | Sun et al. ....................... 370/312 |
| 2009/0305716 A1* | 12/2009 | Ono .......................... 455/452.2 |

FOREIGN PATENT DOCUMENTS

| CN | 1735272 A | 2/2006 |
| CN | 101483812 A | 7/2009 |
| CN | 1101483812 C | 7/2009 |

OTHER PUBLICATIONS

International Preliminary Report on Patentability and Written Opinion mailed May 8, 2012, PCT/CN2010/078370, English translation.
International Search Report for PCT/CN2010/078370 dated Feb. 24, 2011.

* cited by examiner

*Primary Examiner* — Jeffrey M Rutkowski
*Assistant Examiner* — Hardikkumar Patel
(74) *Attorney, Agent, or Firm* — Banner & Witcoff, Ltd.

(57) ABSTRACT

The present invention discloses a method for determining a radio frame bearing a multimedia broadcast multicast service notification message, including: a sending end configuring a Multicast Control Channel (MCCH) Modification Period (MCCHMP), a period coefficient (PeriodCoeff) and a notification message offset (NotificationOffset), and when a system frame number (SFN) modulo a ratio of the MCCHMP to the PeriodCoeff is equal to the NotificationOffset, a radio frame corresponding to a value of said SFN is the radio frame of sending the Multimedia Broadcast Multicast Service (MBMS) notification message. The present invention obtains the radio frame of sending the MBMS notification message by less MCCH information, so that the receiving and analyzing processes of the terminal save power.

20 Claims, 1 Drawing Sheet

METHOD FOR DETERMINING WIRELESS FRAME BEARING MULTIMEDIA BROADCAST MULTICAST SERVICE NOTIFICATION INFORMATION AND TRANSMITTER THEREOF

TECHNICAL FIELD

The present invention relates to the Long Term Evolution (LTE) system, and particularly, to a method for determining a location of bearing the Multimedia Broadcast Multicast Service (MBMS) notification message in a Multimedia Broadcast multicast service Single Frequency Network (MBSFN) area.

BACKGROUND OF THE RELATED ART

With the rapid development of the Internet and the popularization of the mobile phone with the large screen and multiple functions, a large quantity of mobile data multimedia services and various broad bandwidth multimedia services occur, such as the video conference, television broadcast, video on demand, video advertisement, online education, and interactive game and so on, which not only satisfies the continuously increasing service demand of the mobile user, but also brings new service increasing points for mobile operators at the same time. These mobile data multimedia services require that a plurality of users are able to receive the same data at the same time, and comparing with the general data service, these mobile data multimedia services have features of large data quantity, long duration, and sensitive time delay and so on. In order to effectively use the mobile network resources, the 3rd Generation Partnership Project (3GPP) proposes the MBMS service, and this service is a technique of transmitting data from one data source to a plurality of destinations, which implements to share the network (including the core network and the access network) resources, and improves the utilization rate of the network resources (especially the air interface resources). The MBMS service defined by the 3GPP is not only able to implement the pure text and low speed message class multicast and broadcast, but also able to implement the multicast and broadcast of the high speed multimedia service, and provide various rich video, audio and multimedia services, which undoubtedly complies with the trend of the development of the future mobile data, and provides a better service prospect for the development of the 3rd Generation (3G).

The features of the MBMS services are large data quantity of the service, long duration when the terminal is receiving, and constant average data rate. The above features determine that scheduling of the MBMS service and the control signaling configurations are semi-static, namely the scheduling information of the MBMS service and the control signaling information are invariable "during a long time", and thus the system side sends information without variation (sending all the time is for the purpose of the access of a new user at any moment) in each period of the Multicast Control Channel (MCCH) information. Thus if a terminal which has received the MCCH information receives the MCCH information without variation every time, that will cause that the terminal wastes power, and since the quantity of the MCCH information is large, the receiving and analyzing processes consume more power.

Therefore introducing the MBMS notification message is proposed, and the notification message (which is also called as the MCCH change notification, or MBMS notification Indicator, or MBMS notification information, or MBMS notification by some companies in English, and also called as MBMS notification message, MBMS notification information, or MBMS indicator information and so on by some company in Chinese, and this application takes the MBMS notification information as an example) uses a small quantity of information to describe whether the MCCH information to be sent soon is updated comparing with the MCCH information sent last time, and the accessed terminal is only required to monitor a small quantity of MBMS notification message information, and the terminal then determines whether to receive the MCCH information which will arrive soon according to the MBMS notification message. The current LTE R9 has already determined to introduce the MBMS notification message, but it is not determined which radio frames and subframes the MBMS notification message should be born on, which should be described and allocated by one method.

SUMMARY OF THE INVENTION

The above technical problem to be solved in the present invention is to provide a method for determining a radio frame bearing the multimedia broadcast multicast service notification message, which uses the original parameter of the system to determine the radio frame and subframe where the MBMS notification message is located, and is only required to reach an agreement by protocols instead of sending any signaling, and the sending end and the receiving end complete the sending and receiving the MBMS notification message by the way of protocol agreement so as to implement to send the MBMS notification message.

A method for determining a radio frame bearing a multimedia broadcast multicast service notification message, and the method comprises:

a sending end configuring a Multicast Control Channel (MCCH) Modification Period (MCCHMP), a period coefficient (PeriodCoeff) and a notification message offset (NotificationOffset), and when a system frame number (SFN) modulo a ratio of the MCCHMP to the PeriodCoeff is equal to the NotificationOffset, a radio frame corresponding to a value of said SFN is the radio frame of sending the Multicast Broadcast Multicast Service (MBMS) notification message;

wherein when a cell is only covered by one MBSFN area, a value of said MCCHMP is a value of the MCCH modification period of this MBSFN area; when a cell is in overlapped coverage of a plurality of MBSFN areas, the value of said MCCHMP is the value of the MCCH modification period of the MBSFN area with a minimal MCCH modification period among a plurality of MBSFN areas; and said PeriodCoeff denotes the number of times of sending the MBMS notification message in one MCCH modification period.

A relationship formula of said SFN modulo the ratio of the MCCHMP to the PeriodCoeff being equal to the NotificationOffset is:

$$SFN\ mod(MCCHMP/PeriodCoeff) = NotificationOffset$$

wherein the SFN is the system frame number defined in a LTE system, and a value range is 0~1023; said MCCHMP denotes the MCCH modification period, and the NotificationOffset is the offset.

Wherein when the cell is only covered by one MBSFN area, a value of said NotificationOffset is the same with a value of an offset of this MBSFN area;

a value of said PeriodCoeff is less than or equal to a ratio of a value of the MCCH modification period of this MBSFN area to a value of a MCCH repetition period of this MBSFN area.

Wherein when the cell is in overlapped coverage of a plurality of MBSFNs, a value of said PeriodCoeff is less than or equal to a ratio of a value of the MCCH modification period of each MBSFN area covering this cell to a value of a MCCH repetition period of this MBSFN area.

Wherein when the cell is in overlapped coverage of a plurality of MBSFNs, a value of said NotificationOffset selects a value of an offset corresponding to the MBSFN area with a minimal MCCH repetition period among a plurality of MBSFN areas;

or when the cell is in overlapped coverage of a plurality of MBSFNs, a value of said NotificationOffset selects a value of the offset corresponding to the MBSFN area with a minimal MCCH modification period among a plurality of MBSFN areas.

Said method further comprises: determining a subframe bearing the MBMS notification message in said radio frame, and said determining the subframe bearing the MBMS notification message in said radio frame comprises: using a subframe bearing MCCH to bear the MBMS notification message;

or, using a fixed subframe to bear the MBMS notification message by a protocol;

or, using a way of a bitmap to indicate the subframe bearing the MBMS notification message; or using sending a subframe number.

Wherein the step of using a subframe bearing MCCH to bear the MBMS notification message comprises: sending the MBMS notification message in a first subframe bearing the MCCH;

the step of using the way of the bitmap to indicate the subframe bearing the MBMS notification message comprises: using 6 bits, a FDD mode correspondingly indicating subframes #1, #2, #3, #6, #7, and #8, and when a corresponding bit is set to "1", denoting that this subframe is selected as the subframe bearing the MBMS notification message, and a TDD mode correspondingly indicating subframes except subframes #0, #1, #5, and #6;

using sending a subframe number comprises: using 3 bits, selecting 6 types of values therein to describe 6 subframes, in the FDD mode, "000" indicating subframe #1, "001" indicating subframe #2, "010" indicating subframe #3, "011" indicating subframe #6, "100" indicating subframe #7, and "101" indicating subframe #8; and in the TDD mode, "000" indicating subframe #2, "001" indicating subframe #3, "010" indicating subframe #4, "011" indicating subframe #7, "100" indicating subframe #8, and "101" indicating subframe #9.

The present invention further provides a sending end for determining a radio frame bearing a multimedia broadcast multicast service notification message, and comprises: a configuration module and a determining radio frame module; wherein said configuration module is configured to: configure a Multicast Control Channel (MCCH) Modification Period (MCCHMP), a period coefficient (PeriodCoeff) and a notification message offset (NotificationOffset);

said determining radio frame module is configured to: determine a radio frame corresponding to a value of a system frame number (SFN) as the radio frame of sending the Multicast Broadcast Multicast Service (MBMS) notification message when said SFN modulo a ratio of the MCCHMP to the PeriodCoeff is equal to the NotificationOffset;

wherein when a cell is only covered by one MBSFN area, a value of said MCCHMP is a value of the MCCH modification period of this MBSFN area; when a cell is in overlapped coverage of a plurality of MBSFN areas, the value of said MCCHMP is a value of the MCCH modification period of the MBSFN area with a minimal MCCH modification period among a plurality of MBSFN areas; and said PeriodCoeff denotes the number of times of sending the MBMS notification message in one MCCH modification period.

Wherein said determining radio frame module is further configured to: determine the radio frame which satisfies a following formula as the radio frame corresponding to the SFN, $$\text{SFN mod}(\text{MCCHMP}/\text{PeriodCoeff}) = \text{NotificationOffset}$$

wherein the SFN is the system frame number defined in a LTE system, and a value range is 0~1023; said MCCHMP denotes the MCCH modification period, and the NotificationOffset is the offset.

Wherein when the cell is only covered by one MBSFN area, a value of said NotificationOffset is the same with a value of an offset of this MBSFN area; and a value of said PeriodCoeff is less than or equal to a ratio of a value of the MCCH modification period of this MBSFN area to a value of a MCCH repetition period of this MBSFN area.

When the cell is in overlapped coverage of a plurality of MBSFNs, a value of said PeriodCoeff is less than or equal to a ratio of a value of the MCCH modification period of each MBSFN area covering this cell to a value of a MCCH repetition period of this MBSFN area.

Wherein when the cell is in overlapped coverage of a plurality of MBSFNs, a value of said NotificationOffset selects a value of an offset corresponding to the MBSFN area with a minimal MCCH repetition period among a plurality of MBSFN areas;

or when the cell is in overlapped coverage of a plurality of MBSFNs, a value of said NotificationOffset selects a value of the offset corresponding to the MBSFN area with a minimal MCCH modification period among a plurality of MBSFN areas.

Wherein said determining radio frame module further comprises one of following subframe modules, a first subframe module, which is configured to: determine a subframe bearing the MBMS notification message in said radio frame, and use a subframe bearing MCCH to bear the MBMS notification message;

a second subframe module, which is configured to: use a fixed subframe to bear the MBMS notification message by a protocol;

a third subframe module, which is configured to: use a way of a bitmap to indicate a subframe bearing the MBMS notification message;

a fourth subframe module, which is configured to: use sending a subframe number.

The method of the present invention implements to determine the location of the MBMS notification message by the minimal signaling overhead, which is able to implement to determine the location of the MBMS notification message in the cell without the overlapped coverage, and is also able to be applied in the cell with the overlapped coverage to implement to determine the location of the MBMS notification message, thereby obtaining the radio frame sending the MBMS notification message by less MCCH information, and making the receiving and analyzing processes of the terminal save the power.

PREFERRED EMBODIMENTS OF THE PRESENT INVENTION

In order to better describe the present invention, below it will describe the present invention with reference to the examples.

The LTE R9 introduces the MBMS service, and carries out the MCCH sending configuration for the MBMS service of each MBSFN area by taking the MBSFN area as the unit, which is particularly that the MCCH uses the repetition period and modification period, and generally the modification period is greater than the repetition period, and MCCH information is repeatedly sent a plurality of times in one modification period, and MCCH is allowed to be changed, and the MCCH information is allowed to be changed only when the MCCH modification period arrives.

Besides, in order to reduce the receiving end to read the MCCH information without update at the opportunity of each MCCH modification period, the LTE determines to introduce the MBMS notification message, namely the MBMS notification message is sent in each MCCH modification period, the receiving end learns whether the MCCH information is updated at the opportunity of the oncoming MCCH modification period by receiving and analyzing the MBMS notification message, and when the MBMS notification message notifies the receiving end that the MCCH information isn't updated at the opportunity of the oncoming MCCH modification period, the receiving end is able to not receive the MCCH information, or else receives and analyzes the MCCH information.

The main concept of the present invention is to use the equation 1:

$$SFN\ mod(MCCHMP/PeriodCoeff) = NotificationOffset \quad \text{(equation 1)}$$

to determine the radio frame bearing the MBMS notification message. The period coefficient PeriodCoeff in the equation 1 denotes the number of times of the MBMS notification message being sent in one MCCH modification period, and other parameter description refers to the description of the section "Summary of the Invention". The SFN is the System Frame Number.

Secondly, the present invention further provides a method for determining the subframe bearing the MBMS notification message, which is seen in description of the section "Summary of the Invention". The whole invention takes the radio frame as the unit t o count. Each parameter in the equation calculation takes the radio frame as the unit.

EXAMPLE 1

The application without the overlapped coverage is described.

It is assumed that a certain cell belongs to a certain MBSFN area, and this cell only belongs to this MBSFN area. Then the determination of the MCCH Repetition Period (MCCHRP) and the MCCH Modification Period (MCCHMP) of this MBSFN area is as follows:

the radio frame corresponding to the SFN which satisfies the equation: SFN mod repetitionPeriod=offset is the radio frame bearing the MCCH, and this example assumes that the repetitionPeriod is 640 ms, and also can be denoted as 64 radio frames, denoted by 64rf. The value of the offset is 0. Namely, the radio frame corresponding to the value of the SFN which satisfies SFN mod 64rf=0 is the radio frame bearing the MCCH, and it can be learned that radio frames of the values of the SFN being 0, 64, 128, 192, 256 . . . bear the MCCH according to set parameters. Values of the SFN are defined as 0~1023 in the LTE, and are periodically circulated herein.

Furthermore, it is assumed that the MCCH modification period is 2560 ms in this example, and also can be denoted as 256 radio frames, denoted by 256rf. That is, one MCCH modification period in this MBSFN area includes four MCCH repetition periods, namely the MCCH modification period occurs in the radio frames of the SFN 0, 256, 512 . . . , which also can be understood as the MCCH on these radio frames is allowed to be updated. It can be seen that the MCCH modification period only defines how many MCCH repetition periods are apart to allow updating the MCCH information.

The above is MCCH configuration in the MBSFN area defined in the current LTE, and below it will carry out the determination of the radio frame bearing the MBMS notification message according to the method provided by the present invention.

According to the equation 1 provided in the present invention, the value of the parameter PeriodCoeff is determined at first, and this invention suggests 2 or 4, and this example configures this parameter to be 2, and this parameter is sent to the receiving end. Certainly, this parameter can be fixed to a certain value directly by the protocol, and thus sending signaling to the receiving end can be omitted, however, the flexibility of the value of this parameter, fixed by the protocol, is reduced correspondingly.

When the sending end sends the MBMS notification message and the receiving end receives the MBMS notification message, which radio frames and subframes bear the MBMS notification message requires determining, and methods used by both are the same, and it takes the receiving end as an example herein.

The receiving end determines the radio frame bearing the MBMS notification message according to the equation 1 SFN mod(MCCHMP/PeriodCoeff)=NotificationOffset. Particularly the SFN mod(256rf/2)=0 is satisfied, the radio frames of SFN 0, 128, 256, 512 . . . bearing the MBMS notification message are learned, and the MBMS notification message is sent twice in each MCCH modification period.

In this present invention, which MCCH modification periods the MBMS notification messages on those radio frames are functional to is further defined. There are two corresponding rules, and the first one, it is suggested that the MBMS notification messages on the radio frames of SFN 128 and 256 correspondingly indicate whether the MCCH information is updated at the opportunity of the MCCH modification period on the radio frame of SFN 256; or the second one, the MBMS notification messages on the radio frames of SFN 0 and 128 correspondingly indicate whether the MCCH information is updated on the radio frame of SFN 256 (at the opportunity of the MCCH modification period). The MBMS notification messages in other locations and their corresponding MCCH modification periods are determined in this way. The example selects the first one.

In this example, the method for determining the subframe bearing the MBMS notification message in the radio frame which has been determined is further provided. Way 1, the Physical Downlink Control Channel (PDCCH) of the subframe bearing the MCCH bears the MBMS notification message. When the MCCH is born on a plurality of subframes, it is suggested that the MBMS notification message is born on the first subframe bearing MCCH. Using this way is only required to reach an agreement by the protocol instead of sending signaling to the receiving end. Thus the sending end and the receiving end should only comply at the same time. Way 2, the fixed subframe in the radio frame is used, namely the subframe location is fixed by the protocol. For example, the subframe of the subframe number #1 is fixedly used. Using this way is only required to reach an agreement by the protocol instead of sending signaling to the receiving end. Thus the sending end and the receiving end should only comply at the same time. Way 3, the way of the bitmap is used to indicate the subframe bearing the MBMS notification message, and particularly 6 bits are used, and the FDD mode correspondingly indicates subframes #1, #2, #3, #6, #7, and #8, and when the corresponding bit is set to "1", namely it is denoted that this subframe is selected as the subframe bearing the MBMS notification message, and the TDD mode correspondingly indicates subframes except subframes #0, #1, #5, and #6. Way 4, the way of notifying the subframe number is used. When sending the subframe number is used, it particularly uses 3 bits, and 6 types of values are selected therein to describe 6 subframes, and "000" indicates subframe #1, "001" indicates subframe #2, "010" indicates subframe #3, "011" indicates subframe #6, "100" indicates subframe #7, "101" indicates subframe #8 in the FDD mode; "000" indicates subframe #2, "001" indicates subframe #3, "010" indicates subframe #4, "011" indicates subframe #7, "100" indicates subframe #8, and "101" indicates subframe #9 in the TDD mode.

The MBMS notification messages are born in the PDCCH of the selected subframes after determining the subframe by the above four ways.

EXAMPLE 2

Figure 1:
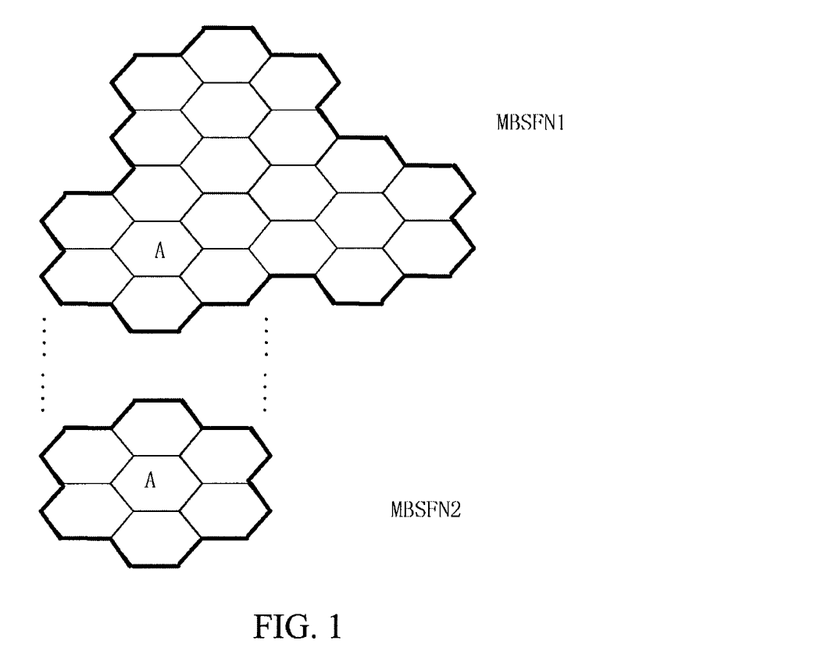
FIG. 1 is a schematic diagram of the MBSFN area overlapped coverage.
Figure 2:
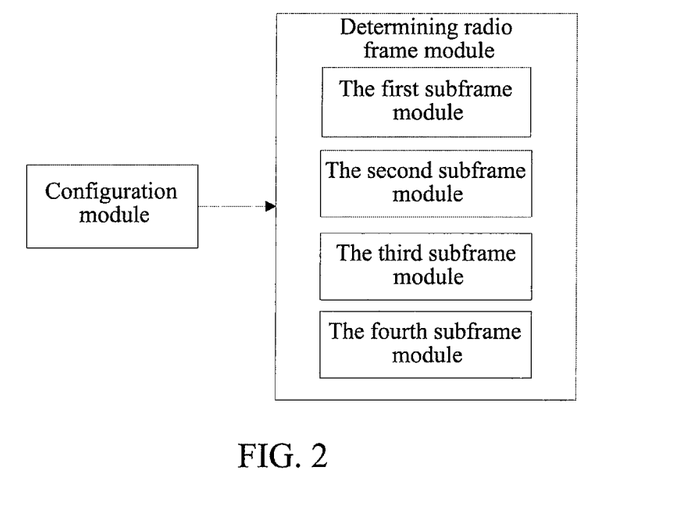
FIG. 2 is a schematic diagram of the sending end for determining the radio frame bearing the MBMS notification message.

The application of one cell under the overlapped coverage of a plurality of MBSFN areas at the same time is described, and this example takes the overlapped coverage of 2 MBSFN areas as an example. The cell A is shown in FIG. 1.

It is assumed that a certain cell is in overlapped coverage of 2 MBSFN areas at the same time, which are denoted by the MBSFN1 and MBSFN2 respectively. Then the determination of the MCCH Repetition Period and the MCCH Modification Period of each MBSFN area is as follows:

the radio frame corresponding to the SFN which satisfies the equation: SFN mod repetitionPeriod=offset is the radio frame bearing the MCCH in the MBSFN1 area, and this example assumes that the repetitionPeriod is 640 ms, and also can be denoted as 64 radio frames, denoted by 64rf. The value of the offset is 0. Namely, the radio frame corresponding to the value of the SFN which satisfies the SFN mod 64rf=0 is the radio frame bearing the MCCH, and it can be learned that the radio frames of the values of the SFN being 0, 64, 128, 192, 256 . . . bear the MCCH according to set parameters. Values of the SFN are defined as 0~1023 in the LTE, and are periodically circulated herein.

Furthermore, it is assumed that the MCCH modification period is 2560 ms in this example, and also can be denoted as 256 radio frames, denoted by 256rf. That is, one MCCH modification period in this MBSFN area includes four MCCH repetition periods, namely the MCCH modification period occurs on the radio frames of the SFN 0, 256, 512 . . . , which also can be understood as the MCCH on these radio frames is allowed to be updated. It can be seen that the MCCH modification period only defines how many MCCH repetition periods are apart to allow updating the MCCH information.

The radio frame corresponding to the SFN which satisfies the equation: SFN mod repetitionPeriod=offset is the radio frame bearing the MCCH in the MBSFN2 area, and this example assumes that the repetitionPeriod is 640 ms, and also can be denoted as 64 radio frames, denoted by 64rf. The value of the offset is 0. Namely, the radio frame corresponding to the value of the SFN which satisfies the SFN mod 64rf=0 is the radio frame bearing the MCCH, and it can be learned that the radio frames of the values of SFN being 0, 64, 128, 192, 256 . . . bear the MCCH according to set parameters. Values of the SFN are defined as 0~1023 in the LTE, and are periodically circulated herein.

It is further assumed that the MCCH modification period is 5120 ms in this example, and also can be denoted as 512 radio frames, denoted by 512rf. That is, one MCCH modification period in this MBSFN area includes 8 MCCH repetition periods, namely the MCCH modification period occurs on radio frames of the SFN 0, 512, 1024 . . . , which also can be understood as the MCCH on these radio frames is allowed to be updated. It can be seen that the MCCH modification period only defines how many MCCH repetition periods are apart to allow updating the MCCH information.

According to the working assumption of the current LTE protocol, even if a certain cell is in overlapped coverage of a plurality of MBSFN areas, this cell only has one MBMS notification message, which is used for notifying whether a plurality MCCH(s) of a plurality MBSFN areas are updated at their own opportunity of the modification period.

According to the equation 1 provided in the present invention, the value of the parameter PeriodCoeff is determined at first, and this invention suggests 2 or 4, and this example configures this parameter to be 2, and this parameter is sent to the receiving end. Certainly, this parameter can be fixed to a certain value directly by the protocol, and thus sending signaling to the receiving end can be omitted, however, the flexibility of the value of this parameter, fixed by the protocol, is reduced correspondingly.

When the sending end sends the MBMS notification message and the receiving end receives the MBMS notification message, which radio frames and subframes bear the MBMS notification message requires determining, methods used by both are the same, and it takes the receiving end as an example herein.

The receiving end can learn which MBSFN areas this cell is currently covered by in each cell, and know values of each MCCH modification period, MCCH repetition period, and MCCH offset in each MBSFN area. The receiving end determines the radio frame bearing the MBMS notification message according to equation 1, SFN mod(MCCHMP/PeriodCoeff)=NotificationOffset. Specifically, the MCCHMP selects the minimal MCCH modification period in the MBSFN1 and MBSFN2 areas, and the MCCH modification period of the MBSFN1 is the minimal one in this example, and the value is 256rf; the value of parameter NotificationOffset is when the cell is in overlapped coverage of a plurality of MBSFNs, the value of NotificationOffset is the same value with the offset in the equation SFN mod repetitionPeriod=offset whose repetitionPeriod is minimal used for describing the MCCH scheduled radio frame among said a plurality of MBSFN areas; or when the cell is in overlapped coverage of a plurality of MBSFNs, the value of NotificationOffset is the same value with the offset of equation SFN mod repetitionPeriod=offset used for describing the MCCH scheduled radio frame in MBSFN area with the minimal MCCH modification period among said a plurality of MBSFN areas. In this example, the value is obtained according to the former one, and since the MCCH repetition period of the MBSFN1 is 640 ms in the example, the offset is 0, and all the MCCH repetition periods of the MBSFN2 are 640 ms, and the offset is 0, and when a cell is in overlapped coverage of a plurality of MBSFNs, the value of NotificationOffset is the same value with the offset in the equation SFN mod repetitionPeriod=offset whose repetitionPeriod is minimal used for describing the MCCH scheduled radio frame among said a plurality of MBSFN areas according to the above principle; and NotificationOffset=0 in this example.

The value of the PeriodCoeff is 2. Then it can be learned that the radio frames of SFN 0, 128, 256, 512 . . . bear the MBMS notification message according to SFN mod (256rf/2)=0, and the MBMS notification message is sent twice in each MCCH modification period. It should be noted that this cell is covered by the MBSFN1 and MBSFN2 at the same time, then the MCCHMP parameter in the equation 1 for determining the radio frame bearing the MBMS notification message according to the present invention should select the minimal one, and it belongs to the MBSFN1 area in this example, and the value is 256rf. Both of the sending end and receiving end should comply with selecting the minimal MCCH modification period to carry out sending and receiving.

The receiving end learns which radio frames the MBMS notification message is born on by the method provided in the present invention, and then how the receiving end carry out receiving? If one receiving end is only interested in the MBMS service in the MBSFN1 area, then the corresponding MBMS notification message is received in the MCCH modification period of the MBSFN1 area, and since the MBMS notification message is sent twice in each MCCH modification period in the MBSFN1 area, the receiving end can receive the MBMS notification message twice, and that is to receive the MBMS notification message every time; or the MCCH updating condition can be accurately learned by receiving MBMS notification message at the first time without receiving the MBMS notification message at the second time.

If one receiving end is only interested in the MBMS service in the MBSFN2 area, then the corresponding MBMS notification message is received in the MCCH modification period of the MBSFN2 area, and since the MBMS notification message is practically sent 4 times in each MCCH modification period in the MBSFN2 area, and since the MCCH modification period of the MBSFN2 area is twice of the MCCH modification period of the MBSFN1 area. The receiving end can receive the MBMS notification message 4 times, and that is to receive the MBMS notification message every time; or the MCCH updating condition can be accurately learned by receiving MBMS notification message at the first time without receiving the MBMS notification message three times afterwards.

If one receiving end is interested in both of the MBSFN1 and the MBSFN2 areas, then the sent MBMS notification message requires receiving every time.

In this present invention, which MCCH modification periods the MBMS notification messages on those radio frames are functional to is further defined.

For the MBSFN1 area, according to this example, which MCCH modification period the MBMS notification messages on those radio frames are functional to is further defined. There can be two corresponding rules, and the first one, it is suggested that the MBMS notification messages on the radio frames of SFN 128 and 256 correspondingly indicate whether the MCCH information is updated at the opportunity of the MCCH modification period on the radio frame of SFN 256; or the second one, the MBMS notification messages on the radio frames of SFN 0 and 128 correspondingly indicate whether the MCCH information is updated on the radio frame of SFN 256 (at the opportunity of the MCCH modification period). The MBMS notification message in other locations and their corresponding MCCH modification periods are determined in this way.

For the MBSFN2 area, which MCCH modification period the MBMS notification messages on those radio frames are functional to is further defined. There can be two corresponding rules, and the first one, it is suggested that the MBMS notification messages on the radio frames of SFN 256 and 512 correspondingly indicate whether the MCCH information is updated at the opportunity of the MCCH modification period on the radio frame of SFN 512; or the second one, the MBMS notification messages on the radio frames of SFN 0 and 256 correspondingly indicate whether the MCCH information is updated on the radio frame of SFN 512 (at the opportunity of the MCCH modification period). The MBMS notification messages in other locations and their corresponding MCCH modification periods are determined in this way.

Generally, the corresponding rule of the MBMS notification message and indicated MCCH modification period can be fixed by the protocol for the simple, for example the above suggested MBSFN1 and MBSFN2 have two corresponding rules respectively, for example the first one or the second one is fixed by the protocol. The first one is fixed in this example, namely for the MBSFN1 area, the MBMS notification messages on the radio frames of SFN 128 and 256 are suggested to correspondingly indicate whether the MCCH information is updated at the opportunity of the MCCH modification period on the radio frame of SFN 256 according to this example; for the MBSFN2 area, the MBMS notification messages on the radio frame of SFN 256 and 512 are suggested to correspondingly indicate whether the MCCH information is updated at the opportunity of the MCCH modification period on the radio frame of SFN 512 according to this example.

In this example, the method for determining the subframe bearing the MBMS notification message in the radio frame which has been determined is further provided. Way 1, the PDCCH of the subframe bearing the MCCH bears the MBMS notification message. When the MCCH is born on a plurality of subframes, it is suggested that the MBMS notification message is born on the first subframe bearing MCCH. Using this way is only required to reach an agreement by the protocol instead of sending signaling to the receiving end. Thus the sending end and the receiving end only should comply at the same time. Way 2, the fixed subframe in the radio frame is used, namely the subframe location is fixed by the protocol. For example, the subframe of the subframe number #1 is fixed to be used. Using this way is only required to reach an agreement by the protocol instead of sending signaling to the receiving end. Thus the sending end and the receiving end only should comply at the same time. Way 3, the way of the bitmap is used to indicate the subframe bearing the MBMS notification message, and particularly 6 bits are used, and the FDD mode correspondingly indicates subframes #1, #2, #3, #6, #7, and #8, and when the corresponding bit is set to "1", namely it is denoted that this subframe is selected as the subframe to bear the MBMS notification message, and the TDD mode correspondingly indicates subframes except subframes #0, #1, #5, and #6. Way 4, the way of notifying the subframe number is used. When sending the subframe number is used, particularly 3 bits are used, and 6 types of values are selected therein to describe 6 subframes, and "000" indicates subframe #1, "001" indicates subframe #2, "010" indicates subframe #3, "011" indicates subframe #6, "100" indicates subframe #7, "101" indicates subframe #8 in the FDD mode; "000" indicates subframe #2, "001" indicates subframe #3, "010" indicates subframe #4, "011" indicates subframe #7, "100" indicates subframe #8, and "101" indicates subframe #9 in the TDD mode.

The MBMS notification messages are born in the PDCCH of the selected subframes after determining the subframe by the above four ways.

EXAMPLE 3

The present invention further provides a sending end for determining the radio frame bearing the multimedia broadcast multicast service notification message, and as shown in FIG. 3, the sending end comprises a configuration module and a determining radio frame module;

the configuration module is used for configuring the Multicast Control Channel (MCCH) modification period (MCCHMP), period coefficient (PeriodCoeff) and notification message offset (NotificationOffset);

the determining radio frame module is used for determining the radio frame corresponding to the value of the SFN as the radio frame of sending the MBMS notification message when the system frame number modulo the ratio of the MCCHMP to the PeriodCoeff is equal to the NotificationOffset.

Wherein said determining radio frame module is further to determine the radio frame which satisfies the following equation as the radio frame corresponding to the SFN, $$\text{SFN mod}(\text{MCCHMP}/\text{PeriodCoeff})=\text{NotificationOffset}$$

wherein the SFN is the system frame number defined in the LTE system, and the value range is 0~1023; said MCCHMP denotes the MCCH modification period, and said PeriodCoeff denotes the number of times of sending the MBMS notification message in one MCCH modification period, and NotificationOffset is the offset.

Wherein when the cell is only covered by one MBSFN area, the value of said MCCHMP is the MCCH modification period of this MBSFN area, and the value of NotificationOffset is the same with the value of offset in this MBSFN area; furthermore, the value of said PeriodCoeff is less than or equal to ratio of the value of the MCCH modification period of this MBSFN area to the value of the MCCH repetition period of this MBSFN area.

Wherein when the cell is in overlapped coverage of a plurality of MBSFNs, the value of said MCCHMP is the value of MCCH modification period of the MBSFN area with the minimal MCCH modification period among a plurality of MBSFN areas;

when the cell is in overlapped coverage of a plurality of MBSFNs, the value of said PeriodCoeff is less than or equal to ratio of the value of the MCCH modification period of each MBSFN area covering this cell to the value of the MCCH repetition period of this MBSFN area.

Wherein, when the cell is in overlapped coverage of a plurality of MBSFNs, the value of said NotificationOffset selects the value of the offset corresponding to the MBSFN area with the minimal MCCH repetition period among said a plurality of MBSFN areas;

or when the cell is in overlapped coverage of a plurality of MBSFNs, the value of said NotificationOffset selects the value of the offset corresponding to the MBSFN area with the minimal MCCH modification period among said a plurality of MBSFN areas.

Wherein, the above determining radio frame module further comprises one of the following subframe modules, the first subframe module, which is used for determining the subframe bearing the MBMS notification message in said radio frame, and particularly is: the subframe bearing the MCCH is used to bear the MBMS notification message;

the second subframe module, which is used for using the fixed subframe to bear the MBMS notification message by the protocol;

the third subframe module, which is used for using the way of bitmap to indicate the subframe bearing the MBMS notification message;

the fourth subframe module, which is used for using sending the subframe number.

In the above examples 1, 2, and 3, when the sending end configures values of the MCCH repetition period, MCCH modification period and PeriodCoeff, the following principle should be complied with in the best condition: when the cell is in overlapped coverage of a plurality of MBSFNs, the value of PeriodCoeff is less than or equal to ratio of the value of the MCCH modification period of each MBSFN area covering this cell to the value of the MCCH repetition period of this MBSFN area; or when the cell is only covered by one MBSFN, the value of said PeriodCoeff is less than or equal to the ratio of the value of the MCCH modification period of this MBSFN area to the value of the MCCH repetition period of this MBSFN area.

Certainly, the above is only a specific embodiment of the present invention, and the present invention is not limited to the above specific methods, and various corresponding modifications and transformations can be made according to the present invention by those having ordinary skills in the art without departing from the spirit or essence of the present invention. But such corresponding modifications and transformations shall all fall into the protection scope of the appended claims of the present invention.

Industrial Applicability

The present invention uses the minimal signaling overhead to implement to determine the location of the MBMS notification message, which is able to implement to determine the location of the MBMS notification message in the cell without the overlapped coverage, and is also able to be applied in the cell with the overlapped coverage to implement to determine the location of the MBMS notification message, thereby obtaining the radio frame of sending the MBMS notification message by less MCCH information, and making the receiving and analyzing processes of the terminal save more power.

What is claimed is:

1. A method for determining a radio frame bearing a multimedia broadcast multicast service notification message, comprising:

a sending end configuring a Multicast Control Channel (MCCH) Modification Period (MCCHMP), a period coefficient (PeriodCoeff) and a notification message offset (NotificationOffset), and when a system frame number (SFN) modulo a ratio of the MCCHMP to the PeriodCoeff is equal to the NotificationOffset, a radio frame corresponding to a value of said SFN is the radio frame of sending the Multimedia Broadcast Multicast Service (MBMS) notification message;

wherein when a cell is only covered by one Multimedia Broadcast multicast service Single Frequency Network (MBSFN) area, a value of said MCCHMP is a value of the MCCH modification period of this MBSFN area; when a cell is in overlapped coverage of a plurality of MBSFNs, the value of said MCCHMP is the value of the MCCH modification period of the MBSFN area with a minimal MCCH modification period among a plurality of MBSFN areas; and said PeriodCoeff denotes a number of times of sending the MBMS notification message in one MCCH modification period.

2. The method as claimed in claim 1, wherein a relationship formula of said SFN modulo the ratio of the MCCHMP to the PeriodCoeff being equal to the NotificationOffset is:

SFN mod (MCCHMP/PeriodCoeff)=NotificationOffset wherein the SFN is the system frame number defined in a Long Term Evolution (LTE) system, and a value range is 0~1023; said MCCHMP denotes the MCCH modification period, and the NotificationOffset is an offset.

3. The method as claimed in claim 1, wherein when the cell is only covered by one MBSFN area, a value of said NotificationOffset is the same with a value of an offset of this MBSFN area;

a value of said PeriodCoeff is less than or equal to a ratio of a value of the MCCH modification period of this MBSFN area to a value of a MCCH repetition period of this MBSFN area.

4. The method as claimed in claim 1, wherein when the cell is in overlapped coverage of a plurality of MBSFNs, a value of said PeriodCoeff is less than or equal to a ratio of a value of the MCCH modification period of each MBSFN area covering this cell to a value of a MCCH repetition period of this MBSFN area.

5. The method as claimed in claim 1, wherein when the cell is in overlapped coverage of a plurality of MBSFNs, a value of said NotificationOffset selects a value of an offset corresponding to the MBSFN area with a minimal MCCH repetition period among said a plurality of MBSFN areas;

or when the cell is in overlapped coverage of a plurality of MBSFNs, a value of said NotificationOffset selects a value of the offset corresponding to the MBSFN area with a minimal MCCH modification period among said a plurality of MBSFN areas.

6. The method as claimed in claim 3, said method further comprises: determining a subframe bearing the MBMS notification message in said radio frame, and said determining the subframe bearing the MBMS notification message in said radio frame comprises: using a subframe bearing MCCH to bear the MBMS notification message;

or, using a fixed subframe to bear the MBMS notification message by a protocol;

or, using a way of a bitmap to indicate the subframe bearing the MBMS notification message; or using sending a subframe number.

7. The method as claimed in claim 6, wherein the step of using the subframe bearing MCCH to bear the MBMS notification message comprises: sending the MBMS notification message in a first subframe bearing the MCCH;

using the way of the bitmap to indicate the subframe bearing the MBMS notification message comprises: using 6 bits, a FDD mode correspondingly indicating subframes #1, #2, #3, #6, #7, and #8, and when a corresponding bit is set to "1", denoting this subframe is selected as the subframe bearing the MBMS notification message, and a TDD mode correspondingly indicating subframes except subframes #0, #1, #5, and #6;

using sending a subframe number comprises: using 3 bits, selecting 6 types of values therein to describe 6 sub-frames, in the FDD mode, "000" indicating subframe #1, "001" indicating subframe #2, "010" indicating subframe #3, "011" indicating subframe #6, "100" indicating subframe #7, and "101" indicating subframe #8; and in the TDD mode, "000" indicating subframe #2, "001" indicating subframe #3, "010" indicating subframe #4, "011" indicating subframe #7, "100" indicating subframe #8, and "101" indicating subframe #9.

8. A sending end for determining a radio frame bearing a multimedia broadcast multicast service notification message, comprising at least one processor for executing instructions, wherein the at least one processor and instructions cause the sending end to configure a Multicast Control Channel (MCCH) Modification Period (MCCHMP), a period coefficient (PeriodCoeff) and a notification message offset (NotificationOffset);

determine a radio frame corresponding to a value of a system frame number (SFN) as the radio frame of sending the Multimedia Broadcast Multicast Service (MBMS) notification message when said SFN modulo a ratio of the MCCHMP to the PeriodCoeff is equal to the NotificationOffset;

wherein when a cell is only covered by one Multimedia Broadcast multicast service Single Frequency Network (MBSFN) area, a value of said MCCHMP is a value of the MCCH modification period of this MBSFN area; when a cell is in overlapped coverage of a plurality of MBSFNs, the value of said MCCHMP is a value of the MCCH modification period of the MBSFN area with a minimal MCCH modification period among a plurality of MBSFN areas; and said PeriodCoeff denotes a number of times of sending the MBMS notification message in one MCCH modification period.

9. The sending end as claimed in claim 8, wherein the at least one processor and instructions further cause the sending end to determine the radio frame which satisfies a following formula as the radio frame corresponding to the SFN, SFN mod (MCCHMP/PeriodCoeff)=NotificationOffset wherein the SFN is the system frame number defined in a Long Term Evolution (LTE) system, and a value range is 0~1023; said MCCHMP denotes the MCCH modification period, and the NotificationOffset is an offset.

10. The sending end as claimed in claim 8, wherein when the cell is only covered by one MBSFN area, a value of said NotificationOffset is the same with a value of an offset of this MBSFN area;

a value of said PeriodCoeff is less than or equal to a ratio of a value of the MCCH modification period of this MBSFN area to a value of a MCCH repetition period of this MBSFN area.

11. The sending end as claimed in claim 8, wherein when the cell is in overlapped coverage of a plurality of MBSFNs, a value of said PeriodCoeff is less than or equal to a ratio of a value of the MCCH modification period of each MBSFN area covering this cell to a value of a MCCH repetition period of this MBSFN area.

12. The sending end as claimed in claim 8, wherein when the cell is in overlapped coverage of a plurality of MBSFNs, a value of said NotificationOffset selects a value of an offset corresponding to the MBSFN area with a minimal MCCH repetition period among said a plurality of MBSFN areas;

or when the cell is in overlapped coverage of a plurality of MBSFNs, a value of said NotificationOffset selects a value of the offset corresponding to the MBSFN area with a minimal MCCH modification period among said a plurality of MBSFN areas.

13. The sending end as claimed in claim 10, wherein the at least one processor and instructions further cause the sending end to:
   determine a subframe bearing the MBMS notification message in said radio frame, and use a subframe bearing MCCH to bear the MBMS notification message;
   use a fixed subframe to bear the MBMS notification message by a protocol;
   use a way of a bitmap to indicate the subframe bearing the MBMS notification message; or
   use sending a subframe number.

14. The method as claimed in claim 2, wherein when the cell is only covered by one MBSFN area, a value of said NotificationOffset is the same with a value of an offset of this MBSFN area;
   a value of said PeriodCoeff is less than or equal to a ratio of a value of the MCCH modification period of this MBSFN area to a value of a MCCH repetition period of this MBSFN area.

15. The method as claimed in claim 2, wherein
   when the cell is in overlapped coverage of a plurality of MBSFNs, a value of said PeriodCoeff is less than or equal to a ratio of a value of the MCCH modification period of each MBSFN area covering this cell to a value of a MCCH repetition period of this MBSFN area.

16. The method as claimed in claim 2, wherein when the cell is in overlapped coverage of a plurality of MBSFNs, a value of said NotificationOffset selects a value of an offset corresponding to the MBSFN area with a minimal MCCH repetition period among said a plurality of MBSFN areas;
   or when the cell is in overlapped coverage of a plurality of MBSFNs, a value of said NotificationOffset selects a value of the offset corresponding to the MBSFN area with a minimal MCCH modification period among said a plurality of MBSFN areas.

17. The method as claimed in claim 4, said method further comprises: determining a subframe bearing the MBMS notification message in said radio frame, and said determining the subframe bearing the MBMS notification message in said radio frame comprises: using a subframe bearing MCCH to bear the MBMS notification message;
   or, using a fixed subframe to bear the MBMS notification message by a protocol;
   or, using a way of a bitmap to indicate the subframe bearing the MBMS notification message; or using sending a subframe number.

18. The method as claimed in claim 5, said method further comprises: determining a subframe bearing the MBMS notification message in said radio frame, and said determining the subframe bearing the MBMS notification message in said radio frame comprises: using a subframe bearing MCCH to bear the MBMS notification message;
   or, using a fixed subframe to bear the MBMS notification message by a protocol;
   or, using a way of a bitmap to indicate the subframe bearing the MBMS notification message; or using sending a subframe number.

19. The sending end as claimed in claim 9, wherein when the cell is only covered by one MBSFN area, a value of said NotificationOffset is the same with a value of an offset of this MBSFN area;
   a value of said PeriodCoeff is less than or equal to a ratio of a value of the MCCH modification period of this MBSFN area to a value of a MCCH repetition period of this MBSFN area.

20. The sending end as claimed in claim 9, wherein
   when the cell is in overlapped coverage of a plurality of MBSFNs, a value of said PeriodCoeff is less than or equal to a ratio of a value of the MCCH modification period of each MBSFN area covering this cell to a value of a MCCH repetition period of this MBSFN area.

* * * * *

UNITED STATES PATENT AND TRADEMARK OFFICE
CERTIFICATE OF CORRECTION

PATENT NO.         : 8,675,533 B2                                                                            Page 1 of 1
APPLICATION NO.    : 13/258626
DATED              : March 18, 2014
INVENTOR(S)        : Gou et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 37 days.

Signed and Sealed this

Twenty-ninth Day of September, 2015

Michelle K. Lee
*Director of the United States Patent and Trademark Office*